April 20, 1971    L. B. COURTOT    3,575,773
LIGHT REFLECTIVE DEVICE
Filed Dec. 28, 1967
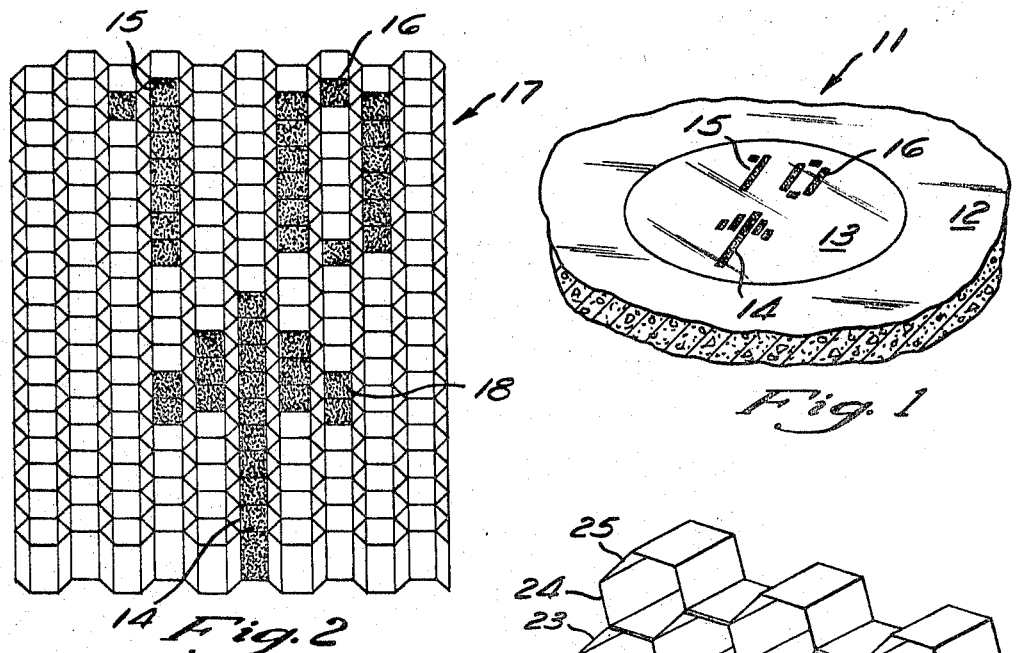
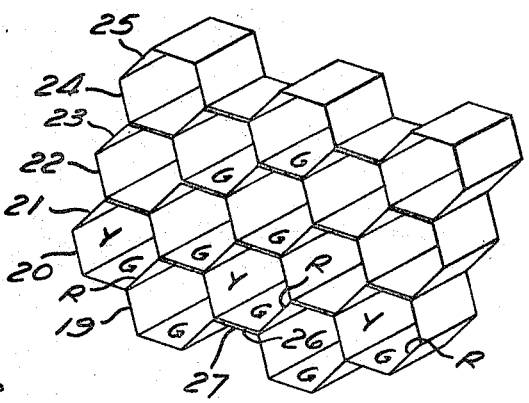
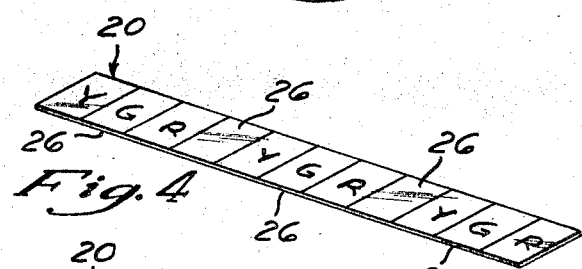
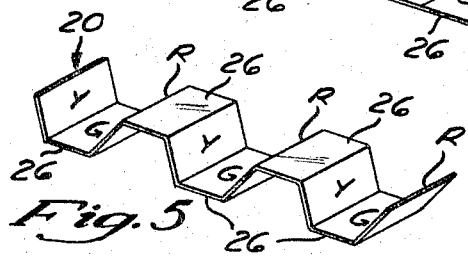
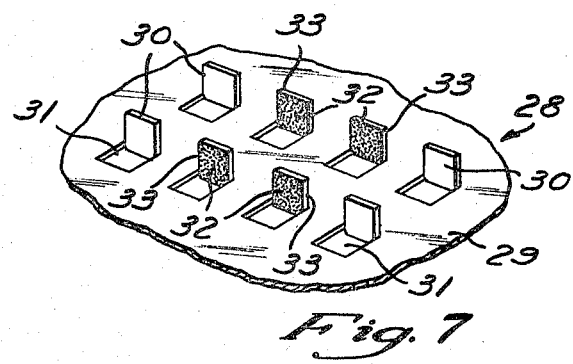
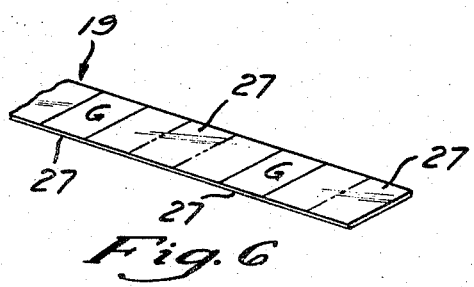
INVENTOR
LOUIS B. COURTOT
BY
McNENNY, FARRINGTON, PEARNE & GORDON
ATTORNEYS

# United States Patent Office 3,575,773
Patented Apr. 20, 1971

3,575,773
LIGHT REFLECTIVE DEVICE
Louis B. Courtot, 25801 Lake Shore Blvd.,
Euclid, Ohio 44132
Filed Dec. 28, 1967, Ser. No. 694,166
Int. Cl. B44f 1/00; B32b 3/12
U.S. Cl. 161—5                                    8 Claims

ABSTRACT OF THE DISCLOSURE

A light reflective panel for decorative and informative purposes which is substantially immune to deterioration from natural elements and heavy transverse loading conditions is provided. A core material having selectively colored light reflective surfaces, parallel to the plane of the array, is arranged so that the colored pattern differs and is totally obscured in some direction depending on the viewing angle and orientation relative to a light source. The core material is encapsulated within or sandwiched between transparent materials in order to maintain the orientation of the array of light reflective surfaces and to preserve their integrity.

BACKGROUND OF THE INVENTION

The present invention relates generally to a light reflective device which presents a different appearance depending on the viewing angle and orientation relative to a light source. Viewing this device from a selected direction imparts to the viewer a pattern of reflective color values which are not fully seen or are totally obscured from other directions. The great advantage of such a device is that it can be used to reflect particular information to the viewer corresponding to his position relative to some datum point. Different information can be presented to another viewer corresponding to his position relative to the same datum point.

PRIOR ART

Light reflective devices, or the like, are often made from a core member covered by a translucent facing on opposite sides of the core member. Heretofore, light diffusing and color effects have been attained by using translucent facing sheets of selected color and by using a core member of suitable color. The color effects obtainable by this method presents a substantially similar pattern of reflective color values independent of the viewing angle and orientation relative to a light source. These devices provide substantial shadow effects which change with changes in the general direction of approach of rays of light.

According to the present invention the article provides a reflective material having an array of substantially parallel surfaces substantially perpendicular to the plane of the array with different reflective color values so that the pattern of color information varies with the viewing angle which is novel and has many improvements and uses.

Among the prior art patents is a changeable picture display device disclosed in Pat. No. 2,815,310 to V. G. Anderson. This device comprises a lenticular viewing screen and a picture sheet disposed behind the screen having a lineiform picture thereon. The device is dependent on alternating parallel complemental lineations, which when viewed successively and alternately, convey coherent ideas. Such a device cannot be used to convey a pattern of color or coherent idea to one field of view while obscuring the same and presenting a completely different pattern of color or coherent idea to another field of view without the likelihood of interchanging patterns or confusion.

SUMMARY OF THE INVENTION

The present invention provides a light reflective device for decorative and informative purposes, or the like, which is capable of presenting a variety of color patterns depending on the viewing angle and orientation relative to a light source. Further, the reflective material is preferably encapsulated in transparent material or mounted between sheets of such material to maintain the orientation of said surfaces and to preserve the integrity of said surfaces.

The illustrated preferred embodiment of the invention includes a core of reflective honeycomb material encapsulated in a clear transparent material such as plastic or glass. One set of substantially parallel surfaces in the honeycomb has been colored in a selective manner prior to encapsulation so as to convey a visual pattern (shown as an arrow pointing to the numeral "10") when viewed with the line of sight in the direction of the arrow and oblique to the surface of the honeycomb. When the viewing angle is laterally rotated from the abovementioned reference in either direction, from 90 to 270 degrees, the arrow and numeral are no longer visible. Reference to the three dimensional nature of the honeycomb is necessary to appreciate this effect.

In another illustrated embodiment, a sheet of reflective material is used as a base with tab segments of the base material cut and bent to a position substantially perpendicular to the base material. The bent tabs have been colored in a selective manner so as to give the appearance of four colored squares when viewed with the line of sight oblique to the base material and substantially normal to an imaginary plane formed by either row of tabs. When the viewing angle is laterally rotated from the abovementioned reference, in either direction from 90 to 270 degrees, the coloring on the squares is no longer visible. Reference to the three dimensional nature of this embodiment is also necessary in order to appreciate this effect.

In both illustrated embodiments of this invention, therefore, I provide a device which can reflect a particular color pattern over a limited field of view and completely obscure the color pattern over another limited field of view and substitute another distinctive color pattern over this second field of view. The cost of manufacture is low since the number of parts is minimized and since the procedures for assembly lend themselves to automation.

The light reflective device may be used in a variety of applications including, but not limited to floor tile having a characteristic color when viewed from one or several directions while being clear of color when viewed from other directions. Another application for the device in its horizontal orientation is in informational markers for roads and aircraft runways. The encapsulation of the core provides a structurally rigid panel able to withstand the heavy loading characteristic of the vehicles which use these surfaces. Road signs having the vertical orientation and paralleling the road can be provided with the device having different readings such as "Stop" and "Go" when viewed by the persons traveling in different directions. Rotation of the device in the form of a lens in any orientation results in a repetitively changing bi-color light source for use in signals such as mounted on locomotives or advertising displays.

OBJECTS OF THE INVENTION

One of the principal objects of the present invention is to provide a new and improved light reflective device with which a color pattern of information can be presented to a viewer which is totally obscured from another viewer who is laterally displaced from the first viewer by an angle of 180 degrees.

Another principal object is to provide a new and improved light reflective device with which multiple patterns of color information can be presented simultaneously to laterally displaced viewers without the risk of confusion from mixing patterns.

A further object is to provide multiple patterns of color information which can be presented alternatively or consecutively to a group of viewers who are substantially in the same lateral viewing position with respect to the device.

Another object is to provide a directional limited marker with a structurally rigid core which is relatively impervious to heavy loading conditions.

Additional objects and advantages of the present invention will become apparent from the following description with respect to the accompanying drawings.

BRIEF DESCRIPTION OF THE DRAWINGS

FIG. 1 is a perspective view of an encapsulated disk shared light reflective device mounted in a section of concrete and reflecting a directional 10;

FIG. 2 is a partial perspective view of the honeycomb core within the light reflective disk of FIG. 1 showing the colored parallel faces normal to the plane of the array;

FIG. 3 is a partial perspective view of the honeycomb core with the G colored reflective surfaces of the honeycomb oriented toward the top of the page;

FIG. 4 is a partial perspective view of a strip of the honeycomb material of FIG. 3 after stripe coloring the reflective surfaces but prior to fabrication;

FIG. 5 is a partial perspective view of a strip of the honeycomb material of FIG. 4 after the strip has been bent into the desired shape for bonding;

FIG. 6 is a partial perspective view of the honeycomb strip of FIG. 3 illustrating a color striping for only one plane of reflecting surfaces; and FIG. 7 shows a modified embodiment of the light reflective device in partial perspective with tabs of the base material bent at an angle relative to the base and the inner reflective tabs being colored.

DESCRIPTION OF THE PREFERRED EMBODIMENTS

Referring to the drawings in greater detail, the structural form of the invention and method for its fabrication are shown in FIGS. 1–6 inclusive. FIG. 1 illustrates a disk shaped light reflective device 11 imbedded in a section of concrete 12 or any appropriate material. In this embodiment, the light reflective surfaces are encapsulated in a clear transparent material such as plastic or glass. The uppermost surface of the encapsulating material 13 is shown to be substantially in the plane of the concrete surface 12.

The arrow 14 is pointing in the direction of the two digits 15 and 16 which comprise the numeral 10. While it is not possible to represent the light reflective characteristics of this device in the plane of the drawing, it should be understood that the arrow pointing toward 10 is not seen if one were looking at the device in a direction opposite to that of the arrow and from any point on a hemisphere having its planar surface normal to both the plane of the disk 13 and the centerline of the arrow 14.

The source of light may be located under the light reflective device 11 or above it. It should be understood that the light reflective device of FIG. 1 may also be oriented in appropriate vertical, or canted mountings as well as the horizontal mounting illustrated. Lighting sources may be positioned on either side of the material at the proper angle of incidence to give the desired effect. The device may be tailored to any particular size or shape depending upon its application.

FIG. 2 illustrates a section of honeycomb core material 17 prior to encapsulation. The spaced color surfaces of the honeycomb 18 are shown to be disposed perpendicular to the plane of the geometrical array. It should be understood that the colored surfaces comprising the arrow 14 and the digits 15 and 16 for the numeral 10 are not visible to a viewer positioned behind these reflective surfaces or to a viewer positioned on either side of the arrow 14 with a line of sight substantially parallel to the colored surfaces.

The honeycomb of FIG. 2 is preferably encapsulated in a clear transparent material such as plastic or glass in order to arrive at the embodiment of FIG. 1. The material used for encapsulation may also be tinted to give a colored effect. A glass or plastic sandwich formed by one piece of the transparent material bonded to each side of the honeycomb can be used according to a known prior art method. The plastic can be of either a heat setting polymeric or a room temperature curing type epoxy resin. The choice of plastic is somewhat dependent on the method of applying color to the reflective surfaces of the core material. A temperature sensitive tint should be avoided when using a heat setting polymeric because of the likelihood of diffusing the tint in the plastic. It should be understood that encapsulation or sandwiching of the core material in transparent material is primarily for the purpose of maintaining the orientation of the core material and to preserve the integrity of the reflective surfaces.

The honeycomb core material of FIG. 3 is oriented with the G colored reflective surfaces toward the top of the page. This orientation is chosen for purposes of describing the fabrication of the core material in the corresponding FIGS. 4, 5 and 6. The method of manufacturing the honeycomb core material by bonding the nodes such as 26 and 27 together after the strips 19, 20, 21, 22, 23, 24, and 25 are bent, or before they are bent and subsequent expansion, does not in and of itself, comprise a part of the present invention, and such material per se is well known in the art.

The strip of reflective core material 20 in FIG. 4 corresponds to the fabricated strip 20 in FIG. 3. The strips of honeycomb material are made from a material having a high reflective index such as aluminum. The strip of material 20 is shown with nodes 27 void of applied color other than the natural color of the core material. The letters Y, G and R, are used to designate the color stripes, yellow, green and red respectively, which have been applied to the strip of material 20.

The coloring on the surfaces are preferably translucent and may be a tinted coating so as to allow the light incident on the surface to be reflected through the color. Color may be applied to the strips of core material in stripes by anodizing or printing by well-known means so that several of the reflective surfaces have color. FIG. 5 illustrates the shape of the strip 20 after coloring and bending but prior to bonding. Alternatively the strips 20, 21, 22, 23, 24, and 25 can be bonded before expansion of the core material as is well known in the art. FIG. 6 shows another strip of core material 19 with only one kind of color stripe applied. The node surfaces 27 are shown with dashed marks which properly align the node surfaces of strip 19 with the node surfaces of strip 20 for bonding purposes. After bonding and expansion, or bending and bonding, the fabricated core material takes on the appearance of FIG. 3 with the surfaces colored as shown. It should be recognized that numerous combinations of colors can be achieved, and the color patterns may be arranged so that a coherent idea can be presented to one field of view while another coherent idea is presented to another field of view. Also combinations of color patterns with coherent ideas will result from a selective coloring of the honeycomb reflective surfaces.

The embodiment of FIG. 7 illustrates another kind of core material 28 with can be used to achieve the light reflective device of FIG. 1. The core material 28 is a sheet of reflective material such as thin metallic foil. A sheet of aluminum foil is one such material which can be used. Portions of the base material 29 are cut and bent at an angle to form tabs 30 projecting from the base material 29. The resulting tabs 30 which are substantially perpendicular to the base material 29 provide the limited directional reflecting characteristics as do the inner surfaces of the honeycomb core material in the previously described embodiment.

The flat surfaces 32 of the tabs 33 are coated with a translucent tinted coating. The color is reflected from these surfaces in much the same manner as it is in the honeycomb core device to give the limited directional reflective characteristics of a colored pattern or a coherent idea. A source of light may be positioned either above or below the tabs 33 since the apertures 31 in the base material 29 present windows for the light to reflect on the colored tabs 32. The tab surfaces 33 can be entirely colored in one color or partially colored in stripes of different colors. The orientation of this device can also be vertical or canted.

The type of core material in FIG. 7 is also intended to be sandwiched or encapsulated in a transparent material such as plastic or glass to maintain the orientation of the core material and to preserve the integrity of the reflective surfaces. A suitable material should be selected for the particular application intended.

Although the preferred embodiments of this invention are illustrated, it is to be understood that various modifications and rearrangements of parts may be resorted to without departing from the scope of the invention disclosed and claimed herein.

What is claimed is:

1. A light reflective panel comprising a plurality of parallel spaced light reflective surfaces disposed in a honeycomb array, said surfaces being substantially normal to said array, at least one of said parallel light reflective surfaces being colored so as to present a colored pattern which differs with the viewing angle and the orientation relative to a light source, said parallel light reflective surfaces being provided with a cover or facing sheet of transparent material which bears on the upper edges of the light reflective surfaces in order to maintain the orientation of said surfaces and to maintain said surfaces normal while allowing the reflection of color from said surfaces, a plurality of said parallel light reflective surfaces being colored in stripes with a coating prior to fabrication into cells forming said array so that a plurality of normal surfaces in adjacent cells have the same color whereby informative insignia is provided, said parallel light reflective surfaces being fabricated from metal foil having a high reflective index and selected areas of the foil are colored in its flat condition prior to shaping the foil into a cellular structure.

2. A light reflector panel comprising a plurality of walls each providing parallel opposed light reflective surfaces disposed in a substantially planar geometric array, said surfaces being substantially normal to the plane of said array, at least one of said surfaces providing a light reflective character which is substantially different than the light reflective character of another associated parallel surface wherein both said one surface and said another associated surface face in the same direction, said walls being sufficiently opaque to prevent the light reflective character of said one surface and said another associated surface from being determined from the remote side thereof, said one surface and said another associated surface being viewable only from the adjacent side of said wall, said walls being encapsulated and embedded in a transparent material, said material having a face substantially parallel to said plane of said array and extending without substantial interruption to said surfaces, said material maintaining the orientation of said surfaces and permitting the viewing of said one surface and said another associated surface through said face from the adjacent side of said walls while said one surface and another associated surface cannot be viewed from the remote side of said walls.

3. The light reflective panel of claim 2 wherein said array is a honeycomb pattern of hexagonal cells.

4. The light reflective panel of claim 2 wherein a plurality of said parallel light reflective surfaces are colored in stripes with a coating prior to fabrication into cells forming said array so that a plurality of normal surfaces in adjacent cells have the same color whereby informative insignia is provided.

5. The light reflective panel of claim 4 wherein said light reflective surfaces have different colors to produce a color change when the line of sight of an observer relative to said reflective surfaces changes.

6. A light reflector panel as set forth in claim 2 wherein a plurality of first surfaces all of which face in one direction are provided with a light reflective character similar to said one surface and a plurality of second surfaces which face in said one direction are provided with a light reflective character similar to said another associated surface, said first surfaces and said second surfaces cooperating to produce a display of information only when viewed at an acute angle with respect to said adjacent side of said walls.

7. A light reflector panel as set forth in claim 6 wherein the opposite sides of said walls are provided with a plurality of third surfaces having a similar light reflective character and a plurality of fourth surfaces having a similar light reflective character which is substantially different than the light reflective character of said third surfaces, said third and fourth surfaces cooperating to produce a display of information different than the information of said first and second surfaces which can be viewed through said face only from said remote side of said walls.

8. A light reflector panel as set forth in claim 6 wherein the light reflective character of said first surfaces is of a different color than the light reflective character of said second surfaces.

References Cited

UNITED STATES PATENTS

| | | | |
|---|---|---|---|
| 2,815,310 | 12/1957 | Anderson | 156—64 |
| 2,828,235 | 3/1958 | Holland et al. | 161—68 |
| 2,836,863 | 6/1958 | Denker | 161—111X |
| 3,134,705 | 5/1964 | Moeller | 156—197 |
| 3,235,431 | 2/1966 | Paige | 156—197 |
| 3,266,790 | 8/1966 | Bradeen | 161—113X |
| 3,366,530 | 1/1968 | Kodich | 161—68 |

JOHN T. GOOLKASIAN, Primary Examiner

H. F. EPSTEIN, Assistant Examiner

U.S. Cl. X.R.

40—132, 137; 52—315; 94—1.5, 27; 161—68